INVENTOR
ROBERT RUPPE UNTERBERGER

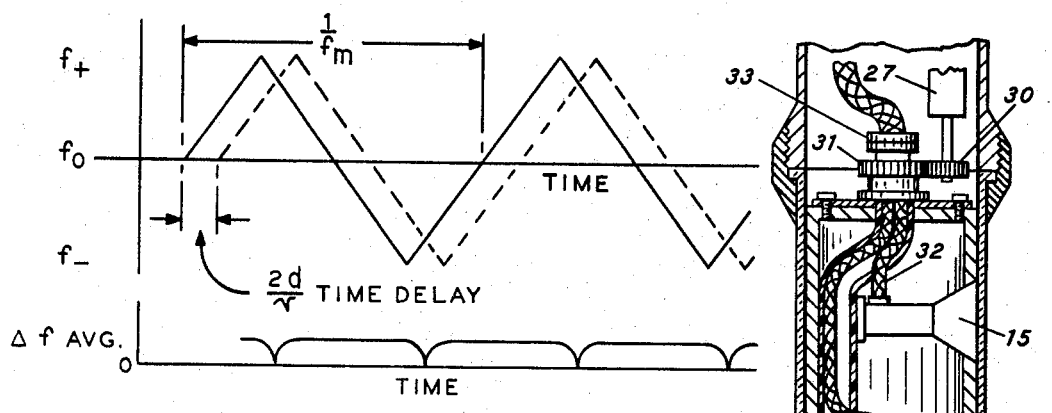
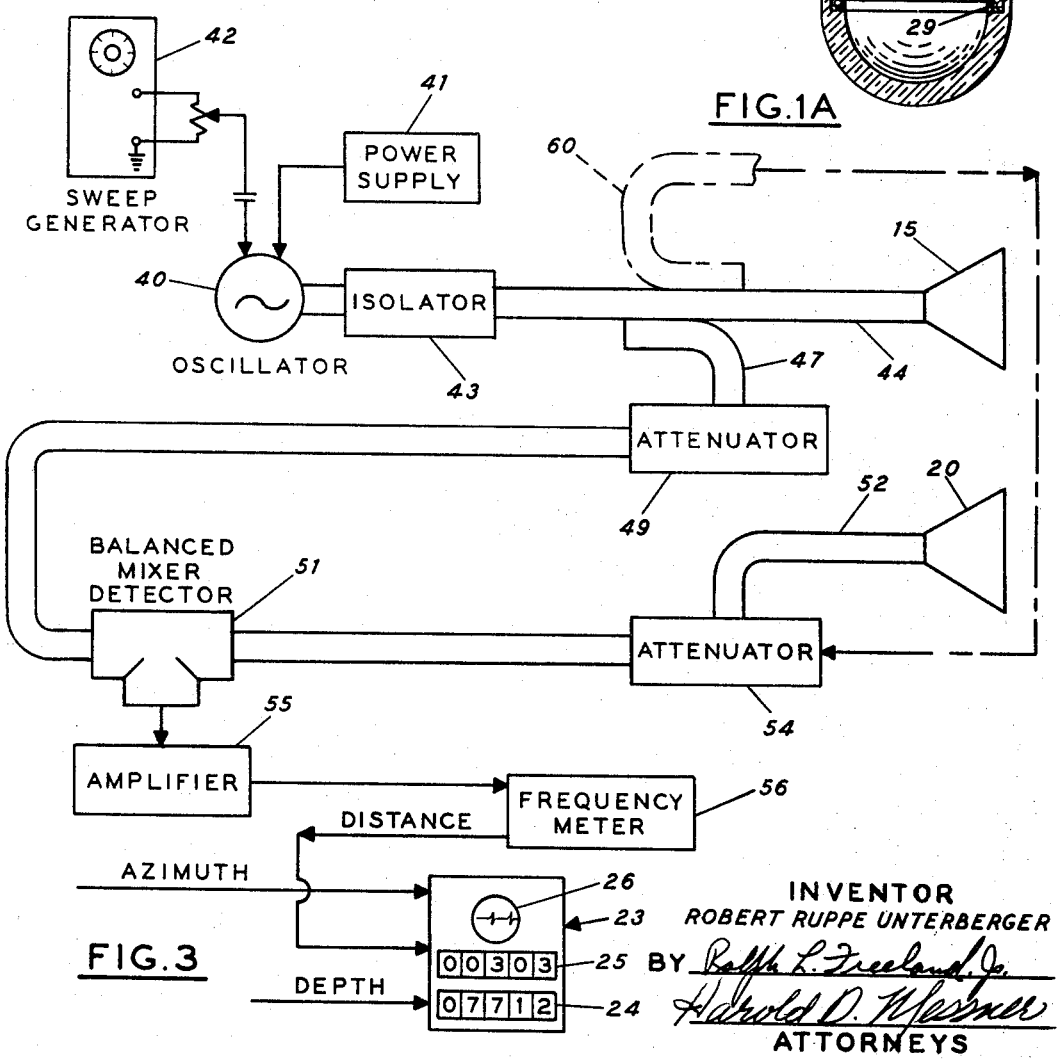

United States Patent Office 3,412,322
Patented Nov. 19, 1968

3,412,322
DISCONTINUITY LOCATION BY FREQUENCY
MODULATION ELECTROMAGNETIC ENERGY
Robert Ruppe Unterberger, Fullerton, Calif., assignor to
Chevron Research Company, San Francisco, Calif., a
corporation of Delaware
Filed Nov. 14, 1966, Ser. No. 594,078
7 Claims. (Cl. 324—6)

ABSTRACT OF THE DISCLOSURE

Electromagnetic discontinuities, such as faults, bedding planes, fractures, or the like, in close proximity of a well bore penetrating an earth formation—say a few inches to several hundred feet—are mapped relative to the well bore by positioning an electromagnetic wave generator in the well bore having an output signal of variable frequency within a frequency range of $10^6$ to $10^{11}$ cycles per second and modulating the frequency of the output signal through a bandwidth of signals at a rate of repetition determined by the lateral distance expected to be measured. After the formation has been irradiated with the modulated energy, signals coming from the discontinuities within the formation are detected, and the instantaneous frequency of the transmitted and reflected signals are compared to indicate the frequency difference therebetween. The frequency difference is then converted to lateral distance based on (1) the velocity of transmission of the energy through the formation, (2) the rate of modulation of the output signal, and (3) the bandwidth of the frequency modulation, to thereby indicate the location of the reflection discontinuities as a function of depth.

This invention relates to a method for stratigraphically mapping an earth formation penetrated by a borehole. More particularly, the invention relates to a technique for employing frequency modulated electromagnetic radiation to stratigraphically map a vertical or horizontal section of an earth formation to accurately locate geologic discontinuities, such as faults, bedding planes, fractures, or the like, in close proximity to the borehole, say a distance of a few inches to several hundred feet.

In carrying out the method of the present invention, an earth formation is stratigraphically mapped by a logging sonde irradiating a preselected sector of the formation with frequency modulated electromagnetic energy capable of propagation through the formation without undue distortion or attenuation. When the energy encounters a geologic discontinuity located a distance interval of a few inches to about two hundred feet from the borehole, a portion of the energy is reflected back to the sonde where the frequency differences between the transmitted and received energy are detected to indicate the distance to the discontinuity, whether lying below the bottom of the well bore or at a lateral distance from the side wall of the well bore. In accordance with the present invention, by repeating the mapping technique at different elevational levels within the well bore, a near-range, two-dimensional stratigraphic map of a vertical section of the formation within close proximity of the borehole can be developed that accurately indicates the location of discontinuities as a function of depth. Furthermore, the sonde may be provided with associated circuit mechanisms for controllably orienting the azimuthal direction of the energy at a plurality of mapping depths so that a three-dimensional map of the formation can also be developed and displayed.

It has been proposed to detect oil in earth formations by using electromagnetic radiation transmitters and receivers operating at certain selected frequencies either from the earth's surface or from within a well bore. For example, Potapenko Patent No. 2,139,460 proposes an electromagnetic radiation system of one or two transmitters and a receiver tuned to the transmitted frequencies. The transmitters generate radio frequency (R.F.), electromagnetic waves of two or more given frequencies; and the amplitudes of the received waves at these frequencies are compared with each other to measure their absorption by the earth formations and their contained liquids. The method is based upon the reflection or absorption of the generated waves; the amplitude of the detected signal is measured at the same frequency as a transmitted wave. While such a system is suitable for certain reconnaissance type surveys—that is, where it is desired to know if there is an electromagnetic anomaly within the range of the transmitter and receiver— no attempt has been made to use radio frequency modulated radiation to measure the distance from a fixed location within a well bore to the anomaly lying remotely from the well bore. Such measurement has not been proposed because of the generally accepted belief that no effective transmission of R.F. energy can be had through fluid-containing formations around a fluid-filled borehole, particularly where one, or both, of said fluids are highly conductive.

It has been more recently proposed to prospect for oil adjacent to salt domes using electromagnetic radiation to map their side walls so that development wells can be drilled with enough accuracy to intersect the adjacent oil-bearing sediments. A technique of this type is disclosed in the copending application of William T. Holser, Robert R. Unterberger and Stanley B. Jones, Ser. No. 253,339, filed Jan. 23, 1963, entitled, "Method of Mapping a Salt Dome at Depth by Measuring the Travel Time of Electromagnetic Energy Emitted From a Borehole Drilled Within the Salt Dome," assigned to the assignee of the present application. In the aforementioned system, the loss-tangent characteristics of halite, the principal constituent of the domes, were found to be small enough to allow propagation of electromagnetic radiation at frequencies within a selected frequency range, such as $10^6$ to $10^{10}$ cycles per second, without undue distortion or attenuation of the emitted or reflected wave. The receiving and emitting antenna system is usually spaced a relatively long distance from the side walls of the salt dome. Therefore, a pulse radiating system is preferred as adequate switching time is available to terminate the pulse before the reflected signals are received, even when the system uses a single antenna for both transmitting and receiving. As the distance from the borehole to the side wall is reduced, however, the rather weak echo signals may arrive at the antenna before it is connected to the receiver and, therefore, remain undetected. To overcome this problem, separate transmitting and receiving antennas may be used; or the pulse width of the emitted signal may be reduced. Where two antennas are used, it has been found that the resolution of the reflected signals from closely adjacent objects is more difficult, especially in ranges less than two hundred feet. Where the pulse width of the energy is reduced and the carrier frequency is rather low, say below $10^6$ hertz, it has been found that the propagating wave is dispersive at the low-frequency end of the spectrum—especially in earth formations other than salt domes, such as limestone, sandstone, shale, or the like. Accordingly, such measurements have not been attempted on a commercial basis in earth formations other than salt domes.

Electric logging generally using DC or low-frequency AC has long been used to stratigraphically map discontinuities in the earth formation at relatively close distances to a well bore penetrating the formation. However, measurements at these frequencies combine the total volume of the material lying between the transmitting electrode and the detecting electrode in the surrounding walls of the drilling fluid at earth formations including any contained fluids. Unfortunately, in such a system, one or more parts of a given body may completely dominate the measurement so that it is difficult to identify without a great deal of additional information (such as mud resistivity, earth formation characteristics, including permeability and lithology) the distance to a discontinuity remote from the well bore. Accordingly, it is desired to have a better method of stratigraphically mapping an earth formation penetrated by a well bore.

It has now been discovered that, if the electromagnetic radiation is frequency modulated, a stratigraphic map of the earth formation can be developed even though the formation contains water. The discovery is based on the fact that, if the frequencies of the emitted radiation is rather high, say greater than $10^6$ but less than $10^{11}$ hertz (cycles per second) and if the electromagnetic discontinuities are located relatively adjacent to the irradiating and receiving antennas, the dispersion and attenuation of the frequency modulated waves do not, surprisingly enough, prevent meaningful results from being obtained. The indications of the location of the discontinuities can be indicated as a function of mapping depth and then the results assimilated to form a stratigraphic map of the formation. In a particular application of the present invention, discontinuities are located a limited distance from the borehole of the formation to be mapped, say from a few inches to as much as two hundred feet from the well bore, and may include fractures within a given rock formation, such as limestone, faults through a series of sedimentary beds, or the interfaces formed between different rock formations. The problem of highly conductive fluids within an earth formation is most severe in relatively permeable formations, say those in the millidarcy range, or in formations having a relatively high porosity, say 20 to 40 percent. In such an environment, the far range of the electromagnetic ranging technique of the present invention is correspondingly reduced, say to 20 to 50 feet from the borehole.

Further objects and features of the invention will be readily apparent to those skilled in the art from the specification and appended drawings illustrating a preferred embodiment, wherein:

FIGURE 2 is a waveform diagram useful in understanding the use of an FM irradiation system for ranging from the well bore to the fault of the earth formation; and FIGURE 3 is a schematic diagram of the transmitter and receiver and the associated systems for determining lateral distances in accordance with the method of the present invention.

Figure 1:
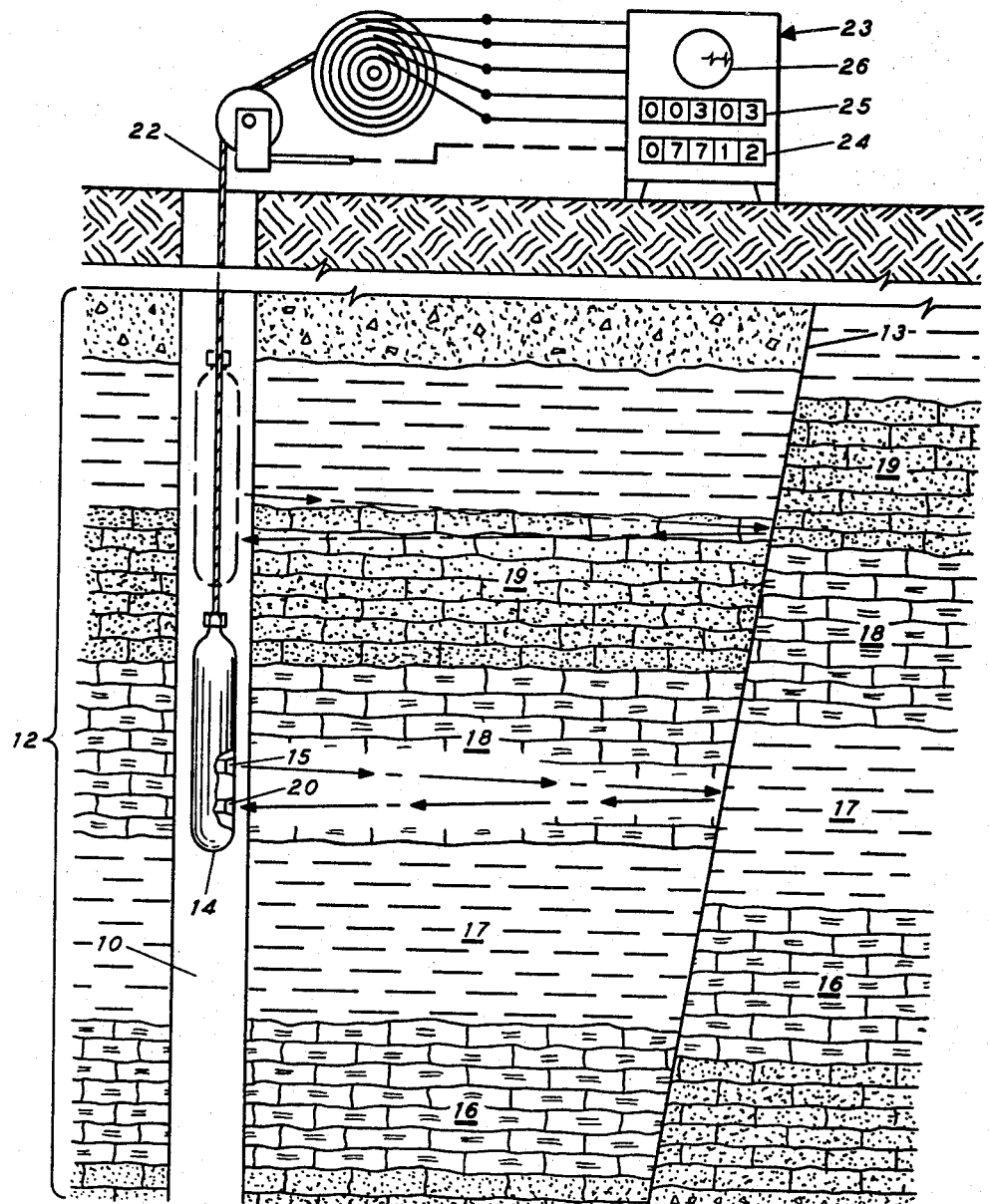
FIGURE 1 is a sectional view illustrating a well bore penetrating a bedded earth formation where a fault is located adjacent to the wel bore and illustrating the position of an electromagnetic energy transmitting and receiving system within the well bore along with associated equipment at the earth's surface above the penetrated earth formations.

Reference is now made to the drawings. In particular, FIGURE 1 illustrates use of the method of the present invention for measurement of the lateral distance from a well bore 10 to a geologic discontinuity within an earth formation 12. The purpose of such measurement is to develop a stratigraphic map of the formation in which the location of the discontinuities in relation to the well bore is developed and displayed to aid in identifying commercial accumulations of hydrocarbons, minerals, etc.

Fault 13 marks the boundary between differentially moved sections of formation 12 and is often of interest to a geophysicist in his analysis of a formation. To map the location of fault 13, at depth, the ranging technique of the present invention is accomplished by selective transmission and reception of frequency modulated electromagnetic energy from a sonde 14 positioned within well bore 10. The sonde 14 may be held stationary during the logging operation or may be continuously raised through a borehole to provide a continuous log. The energy is transmitted by transmitting horn antenna 15 pointed toward the side wall of the borehole for propagation through earth formation 12 in a horizontal plane relative to the borehole 10, say through an azimuthal sector of strata 18 to fault 13. Transmitting antenna 15 is preferably a directive antenna since the energy will have maximum penetration within earth formations if concentrated in a pre-selected direction, say, in an azimuthal direction relative to the axis of the well bore. Because the sedimentary beds 16, 17, 18 and 19 on each side of fault 13 are usually of different dielectric constants, a reflecting surface exists at the fault 13. Moreover, to collect the reflected energy, a receiving antenna 20 is oriented in the same azimuthal direction as the transmitting antenna 15.

The beds closest to the borehole 10 may have either a higher or lower dielectric constant than the reflecting strata. Where the near strata is limestone—for example, strata 19—the real part of the complex dielectric constant equals 8. Accordingly, reflections may occur from the beds to the right of the fault 13 whether they are of shale (real part of the dielectric constant equals 30) or of sandstone (real part of the dielectric constant equals 3.78).

In carrying out the method, the center frequency of the frequency modulated electromagnetic energy is preferably rather high, say at least $10^6$ hertz but not greater than $10^{11}$ hertz (cycles per second), so as to propavate, without undue distortion or attenuation, within the region of the formation in close proximity of the borehole 10 to define the location of the fault 13 relative to the borehole. To determine the lateral distance from the borehole 10 to the fault, the frequencies of the transmitted and received energy are then compared, as explained in more detail below. The compared results are then transmitted along a portion of cable 22, which supports the sonde, to the earth's surface to recording and display apparatus 23. The mapping depth of the sonde within the well bore is recorded on indicator 24, and the lateral distance to the fault 13 is recorded on indicator 25. As the sonde is traversed through the borehole, a series of such depth-distance readings may be obtained so that a stratigraphic map of a vertical section of the formation can be indicated and displayed. A horizontal section of the formation may be developed at each mapping depth by selective reorienting, in azimuth, the antennas 15 and 20. The azimuthal direction of the antennas is indicated at position indicator 26.

FIGURE 1A illustrates suitable mechanisms for reorienting antennas 15 and 20 in azimuth at each mapping depth. As shown, antenna rotor 27 connects to housing 28 through gears 30 and 31. Housing 28 is supported on bearings 29 and is fitted with openings through which the antennas 15 and 20 extend. Energization of the antennas is by leads 32 connected to associated circuitry in the sonde (not shown) through connector 33. Rotor 27 includes a sensor suitably connected to the position indicator 26 at the earth's surface (FIGURE 1). As the rotor 27 is actuated, as by other associated circuitry in the sonde and at the earth's surface well known in the control art, the antennas are rotated through a series of selected azimuthal directions at each mapping depth. In this manner, the earth formation 12 may be mapped in any given azimuthal direction at each mapping depth, and this direction can be indicated at the earth's surface. With this adaptation of the method of the present invention, there will thus be provided a three-dimensional stratigraphic map of the earth formation 12 in which lateral distances to geologic discontinuities, such as fault 13, can be easily indicated and displayed.

Since the electromagnetic energy is transmitted through earth formation 12 at a velocity somewhat slower than its velocity in air, the wavelength of the transmitted energy is shorter in the earth formation than it is in air. In a pulsed R.F. transmission system, the time required to start and stop the pulses and to prepare the necessary receiving equipment for reception is relatively longer so that the energy could travel through at least two hundred feet of lateral distance and return to the receiver before the receiver is capable of detecting reflected signals. In accordance with the present invention, it is desired to detect the location of geologic discontinuities at ranges less than two hundred feet from the borehole. It is thereafter proposed that a frequency modulated (FM) ranging system operating within the aforementioned frequency range be employed to measure these distances.

FIGURE 2 illustrates the principle of operation of an FM ranging system. The transmitter of the FM system has a center frequency $f_0$ equal to at least $10^6$ but less than $10^{11}$ hertz (cycles per second). The frequency of the transmitter is varied from $f_0$ to $f+$ and $f-$, as shown, in a linear fashion, but such that $f+$ is within the aforementioned frequency range. This variation can be sinusoidal, however, as it can be shown that the average frequency difference over a cycle of sinusoidal modulation is equivalent to that obtained from a linear variation within the same modulating period. One cycle of this variation is accomplished at a rate of $f_m$ hertz so that the time required to vary the energy through the full range of frequencies (one full cycle) is $1/f_m$ second. In the length of time that it has taken to transmit energy out to a discontinuity and for that energy to be reflected back to the formation, the frequency then being transmitted by the transmitter has changed in frequency by a certain finite amount determined by the rate at which the transmitter's frequency is being varied.

In FIGURE 2, travel time of the wave is illustrated as a time delay and is represented by the quantity $2d/v$ where $d$ is the distance to the discontinuity and $v$ is the velocity of transmission of the energy through the formation 12 and is given by the equation:

$$v = \frac{c}{n} = c \bigg/ \sqrt{\frac{E'}{E_0}}$$

where $c$ is the speed of light and $n$ and $E'/E_0$ are the index of refraction and the real part of the dielectric constant of the formation normalized by that of free space, respectively. The difference in frequency of the transmitted energy and the reflected energy represents the distance to the discontinuity and back. This variation of the transmitter frequency is repeated over a number of cycles; as these two signals are beat one against the other in a suitable mixer, the resulting average difference frequency is continuously recorded to indicate the distance to the discontinuity. This determination is based on a knowledge of the index of refraction of the intervening formation, as determined by an analysis of cores taken from the formation during drilling of the well bore.

The relationship of the difference in frequency to distance is found in the following equation:

Difference in frequency
= rate of change of the changing frequency
× time between transmission and reflection $$f = Rf \times T$$

which can be written as:

$$f = \frac{B}{\frac{1}{2f_m}} \times \frac{2d}{v}$$

where:
$f_m$ = modulation rate
$B$ = band width of the frequency modulation
$d$ = lateral distance to the discontinuity, and
$v$ = the velocity of transmission in the formation which, for measurement purposes, is equal to:

$$v = c \bigg/ \sqrt{\frac{E'}{E_0}}$$

where:
$c$ = speed of light in air
$E'$ = the real part of the complex dielectric constant of the intervening formation at the center frequency
$E_0$ = the real part of the complex dielectric constant of free space.

In accordance with the above equation, any variation in frequency of the transmitted and received energy may be directly related to distance to the discontinuity. For sandstone formations where $E'/E_0$ is 3.78, a lateral distance to a discontinuity of one foot away requires a time of 3.9 nanoseconds; and the difference in frequency between the transmitted and the received signal is 62.7 hertz where the modulation rate is 115 times per second and the band width (B) is 70 megahertz. Other ranges are as follows:

| Distance in feet | Time in nanoseconds | Frequency difference in hertz |
| --- | --- | --- |
| 2 | 7.8 | 125 |
| 3 | 11.8 | 188 |
| 4 | 15.6 | 250 |

To improve the near range resolution of the system, the rate of change of the changing frequency ($R_f$) can be increased by increasing the band width (B) of frequency modulation. In this regard, it has been found that the rate of change of the changing frequency ($R_f$) can be equal to about $10^6$ to $10^{11}$ hertz per second for detecting discontinuities spaced a distance from a few inches to two hundred feet from the ranging system. However, the problem of highly conductive fluids within an earth formation to be mapped by the present method is most severe in relatively permeable formations, say those in the millidarcy range, or formations having a relatively high porosity, say 20 to 40 percent. In such environment, the far range resolution of the electromagnetic ranging technique is correspondingly reduced, say from 20 to 50 lateral feet from the borehole.

FIGURE 3 illustrates a schematic diagram of a ranging system for performing the method of the present invention. In this figure, an oscillator 40 is energized by power supply 41 to generate the basic frequency for transmission into the earth formation 12. The oscillator may be a magnetron or klystron capable of operating at the desired frequencies and power output. A sweep generator 42 is synchronized with the oscillator and generates a varying potential at the frequency $f_m$ to cause variation of the transmitted frequency about its center frequency $f_0$. The output of the oscillator is supplied through an isolator 43 to a transmission line 44 carrying the energy to transmitting antenna 15. Between the isolator 43 and the transmitting antenna is a directional coupler 47 for sampling the frequency of the oscillator 40. The sampled signal is supplied through attenuator 49, as one input, to a balanced mixer detector 51.

As shown in FIGURE 3, receiving antenna 20 is located adjacent to the transmitting antenna and connected through a transmission line 52 to an attenuator 54. The output of attenuator 54 is supplied as a second input to balanced mixer detector 51 where the transmitted and recived signals are mixed to develop a difference freqency. This difference frequency is fed into amplifier 55. A frequency meter 56 measures the frequency of the signal from the balanced mixer detector and supplies that information to recording and display apparatus 23. A camera (not shown) can be utilized to photograph the distance information on distance indicator 25 from which a stratigraphic map of the formation can be plotted by successive associating of a given distance value with depth information on indicator 24 and the azimuthal information on indicator 26. The frequency meter 56 may also include a low frequency spectrum analyzer that can resolve multiple signals being reflected from more than one discontinuity located in the same azimuthal path, one behind the other, by using a narrow band amplifier with a sweeping local oscillator to identify the signals at the different frequencies.

Another form of the transmiter-receiver circuit for the FM ranging system of the present invention is shown in phantom line in FIGURE 3 and employs a single antenna for both transmitting and receiving the electromagnetic energy to reduce the size of the downhole components of the equipment and to increase the near range resolution of the system. In accordance with this embodiment of the invention, a single antenna, say antenna 15 of FIGURE 3, can be adapted for this purpose by connecting a directional coupler 60 (shown in phantom line) in series between the antenna and attenuator 54 to supply the second input to balanced mixer detector 51. The adaptation of the horn antenna 15 for use in this manner is based on the fact that, on any transmission line, the existing electromagnetic field is, in general, considered to result from two traveling waves on the line; and these waves may be selectively sampled by directional coupling techniques, such as coupler 60, without unduly reducing the efficiency of the antenna in either its transmitting or receiving states. After the reflected signal is received by the antenna and coupled to attenuator 54, the transmitted and received signals are then beat together at the mixer detector 51 to produce a different freqency into amplifier 55 and, ultimately, to give an indication of distance to the discontinuity, as previously described.

Another modification of the system now shown herein is the use of a horn antenna with modifications to develop circularly polarized electromagnetic energy, such as placing quarter wave plates within the body of the transmitting horn antenna. In situations where the present invention is useful, under certain conditions only circularly polarized energy can be transmitted successfully through rock formations having a rather high water content.

It is understood in electromagnetic arts that, when two signals of different frequencies are mixed, the combination produces four distinct signals: that is, a first signal, a second signal, a signal at the sum frequency of the two frequencies, and a signal at the differnce freqency between the two frequencies. The signal of interest in the present inventtion is the difference frequency which detects the change in the frequency of the transmitted energy between the time it is transmitted and the time it is received. That length of time is the time taken for the electromagnetic energy to be transmitted out to the discontinuity and to return.

While certain preferred embodiments of the invention have been specifically disclosed, it should be understood that the invention is not limited thereto as many variations will be readily apparent to those skilled in the art, and the invention is to be given its broadest possible interpretation of the following claims.

I claim:
1. The method of locating electromagnetic discontinuities within rock formations traversed by a well bore which comprises: (1) positioning in said well bore at a known mapping depth an electromagnetic wave generator having an otuput signal of variable frequency within the frequency range from about $10^6$ to $10^{11}$ hertz; (2) modulating the frequency of said output signal of said wave generator repeatedly through a bandwidth of signals at a rate of change determined by the lateral distance expected to be measured; (3) irradiating said formation surrounding said well bore with said modulated electromagnetic energy; (4) simultaneously detecting in said well bore the electromagnetic energy reflected from an electromagnetic discontinuity within said rock formation having a different dielectric constant from that of said rock formation; and (5) comparing the instantaneous frequency of said transmitted and said reflected signals to each other to detect the frequency difference therebetween to indicate distance to said discontinuity from said well bore within said formation.

2. A method in accordance with claim 1 in which said distance to said discontinuity is determined in accordance with the formula:

$$\Delta f = \frac{B}{\frac{1}{2f_m}} \times \frac{2d}{v}$$

where
$\Delta f$ = difference frequency
$f_m$ = modulation rate
$B$ = band width of the frequency modulation
$d$ = lateral distance to the discontinuity, and
$v$ = velocity of transmission in the formation which for measurement purposes, is equal to:

$$c/\sqrt{\frac{E'}{E_0}}$$

where
$c$ = speed of light in air
$E'$ = the real part of the dielectric constant of the formations at the center frequency
$E_0$ = the real part of the dielectric constant of air.

3. The method of claim 2 wherein the rate of change of the changing frequency, $B/1/2f_m$, is from $10^6$ to $10^{11}$ hertz so that the instantaneous compared signal can represent a distance from said discontinuity to said well bore of from about one inch to two hundred feet.

4. The method of claim 1 wherein said frequency of said transmitted signal and said frequency of said reflected signal are beat against each other to detect the frequency difference therebetween, and said difference frequency is related to distance in accordance with the velocity of transmission of electromagnetic energy through said rock formation at the center frequency thereof.

5. The method of mapping faults, bedding planes, fractures or the like within a rock formation traversed by a well bore which comprises: (1) positioning in said well bore an electromagnetic wave generator at a plurality of mapping depths in sequence, said generator having an output in the frequency range of $10^6$ to $10^{11}$ hertz and being frequency modulated through a band width of at least 70 megahertz at least 115 times per second; (2) irradiating said formation surrounding said well bore at each mapping depth with said electromagnetic energy; (3) simultaneously detecting in said well bore and adjacent to said point of transmission the electromagnetic energy in the transmitted band that is reflected from said faults, bedding planes, fractures or the like of said rock formation; (4) comparing the instantaneous frequency of said transmitted energy with the instantaneous frequency of said reflected energy and detecting the frequency difference therebetween; and (5) recording said frequency difference in terms of lateral distance from said well bore to said faults, bedding planes, fractures or the like at each of said mapping depths of said generator and receiver in said well bore to thereby provide a stratigraphic map of said formation.

6. A method of claim 5 in which said energy is confined to an azimuthal path relative to said well bore, and said distance to said faults, bedding planes, fractures or the like is measured along said path.

7. A method of claim 6 in which said energy is confined to a series of azimuthal paths in sequence relative to said well bore at each mapping depth to thereby provide a three-dimensional stratigraphic map of said formation.

References Cited

UNITED STATES PATENTS

| | | | |
|---|---|---|---|
| 3,271,766 | 9/1966 | Nilssen | 343—14 |
| 3,286,163 | 11/1966 | Holser et al. | 324—6 |

RUDOLPH V. ROLINEC, *Primary Examiner.*

GERARD R. STRECKER, *Assistant Examiner.*